(12) United States Patent
Shibata et al.

(10) Patent No.: US 7,988,210 B2
(45) Date of Patent: Aug. 2, 2011

(54) CABIN DOOR DEVICE

(75) Inventors: Takashi Shibata, Sakai (JP); Yoshifumi Horiuchi, Sakai (JP); Yoshihiro Kawahara, Sakai (JP); Mitsugu Kobayashi, Sakai (JP)

(73) Assignee: Kubota Corporation, Osaka (JP)

( * ) Notice: Subject to any disclaimer, the term of this patent is extended or adjusted under 35 U.S.C. 154(b) by 816 days.

(21) Appl. No.: 11/726,393

(22) Filed: Mar. 21, 2007

(65) Prior Publication Data
US 2008/0093883 A1 Apr. 24, 2008

(30) Foreign Application Priority Data

Oct. 20, 2006 (JP) ................................. 2006-286567
Oct. 26, 2006 (JP) ................................. 2006-291508

(51) Int. Cl.
*E05B 15/02* (2006.01)
*E05B 15/00* (2006.01)

(52) U.S. Cl. ................ 292/340; 292/341; 292/DIG. 15; 16/82; 49/394; 296/146.9

(58) Field of Classification Search .................. 292/262, 292/278, 340, 341, DIG. 15; 16/82, 85, 374; 49/394; 296/146.9
See application file for complete search history.

(56) References Cited

U.S. PATENT DOCUMENTS

| | | | | |
|---|---|---|---|---|
| 3,666,305 A | * | 5/1972 | Schlichter | 292/48 |
| 3,858,916 A | * | 1/1975 | Torii et al. | 292/45 |
| 4,322,103 A | * | 3/1982 | Acton | 292/288 |
| 4,593,946 A | * | 6/1986 | Rich | 292/288 |
| 5,112,091 A | * | 5/1992 | Kluting | 292/262 |
| 5,165,742 A | * | 11/1992 | Frayne | 292/262 |
| 5,286,073 A | * | 2/1994 | Ui | 292/216 |
| 5,306,053 A | * | 4/1994 | Gurusami et al. | 292/278 |
| 6,048,005 A | * | 4/2000 | Rotondi | 292/262 |
| 6,158,787 A | * | 12/2000 | Kutschat | 292/214 |
| 6,176,040 B1 | * | 1/2001 | Sugihara | 49/394 |
| 6,419,284 B1 | * | 7/2002 | Kutschat | 292/56 |
| 7,137,662 B2 | * | 11/2006 | Nakayama et al. | 296/190.11 |
| 7,338,097 B2 | * | 3/2008 | Marzolf et al. | 292/216 |
| 2006/0272125 A1 | * | 12/2006 | Yoakum | 16/82 |

FOREIGN PATENT DOCUMENTS

| | | | |
|---|---|---|---|
| EP | 1757738 A1 | * | 2/2007 |
| JP | 3108182 | | 10/1993 |
| JP | 05256059 A | * | 10/1993 |
| JP | 06211048 A | | 8/1994 |
| JP | 3177081 | | 7/1995 |
| JP | 07172171 A | * | 7/1995 |
| JP | 08080746 A | | 3/1996 |
| JP | 10035288 A | | 2/1998 |
| JP | 2000142112 A | | 5/2000 |

* cited by examiner

*Primary Examiner* — Carlos Lugo
(74) *Attorney, Agent, or Firm* — The Webb Law Firm

(57) ABSTRACT

A cabin door device having a cabin frame, comprises: a door mounted to a side part of the cabin frame so as to be moveable between a fully closed position and a fully open position; and a main striker supported by the cabin frame, wherein the door has a lock device, and the door is held in the fully closed position by the lock device engaging the striker; and an auxiliary striker that is supported by the cabin frame and whose position can be changed between a held posture, in which the door is held at an intermediate position between the fully closed position and the fully open position by coupling with the lock device, and a retracted position in which the lock device of the door is allowed to engage with the striker.

9 Claims, 13 Drawing Sheets

(A)
(B)

CABIN DOOR DEVICE

BACKGROUND OF THE INVENTION

1. Field of the Invention

The present invention relates to a cabin door device to be mounted to a work vehicle or other vehicle.

2. Description of the Related Art

Prior art such as that disclosed in JP 3108182 and JP 3177081 is known in which an auxiliary striker changes to a held position in a lateral direction and links with a lock device to create a state in which a door is slightly open; and air within a cabin can be discharged or outside air can be brought into the cabin.

In a conventional cabin door device disclosed in JP 3108182, an auxiliary striker is caused to rotate about 270°, whereby the auxiliary striker can be switched to a held position and a retracted posture. In a conventional cabin door device disclosed in JP 3177081, an auxiliary striker is caused to rotate about 180°, whereby the auxiliary striker can be switched to a held posture and a retracted posture.

When the auxiliary striker is rotated or pivoted in a wide range of angles when the auxiliary strikers are thus switched to the held posture and the retracted posture, a wide space must be provided to allow the auxiliary striker to rotate or pivot. For this reason, problems arise in that, e.g., the arrangement of equipment in the cabin will be limited, and in that, when luggage or the like is placed in a position where the auxiliary striker rotates or pivots, the position of the auxiliary striker cannot be changed, and the ability to operate the auxiliary striker is impaired.

SUMMARY OF THE INVENTION

The object of the invention is to solve or alleviate some of the problems in the conventional device.

A cabin door device having a cabin frame, comprising:
a door mounted to a side part of the cabin frame so as to be moveable between a fully closed position and a fully open position; and
a striker supported by the cabin frame, wherein the door has a lock device, and the door is held in the fully closed position by the lock device engaging the striker; and
an auxiliary striker that is supported by the cabin frame and whose position can be changed between a held posture, in which the door is held at an intermediate position between the fully closed position and the fully open position by coupling with the lock device, and a retracted position, which is displaced toward an interior of the cabin and in which the lock device of the door is allowed to engage with the striker; wherein the auxiliary striker is pivotable about an axis in a fore and aft direction.

DESCRIPTION OF THE PREFERRED EMBODIMENTS

Preferred embodiments of the present invention shall be described below with reference to the accompanying drawings. A plurality of embodiments shall be described. However, combinations of characteristics disclosed in the specified embodiments and characteristics disclosed in the other embodiments are included within the scope of the present invention.

(Overall Structure of Utility Vehicle)

Figure 1:
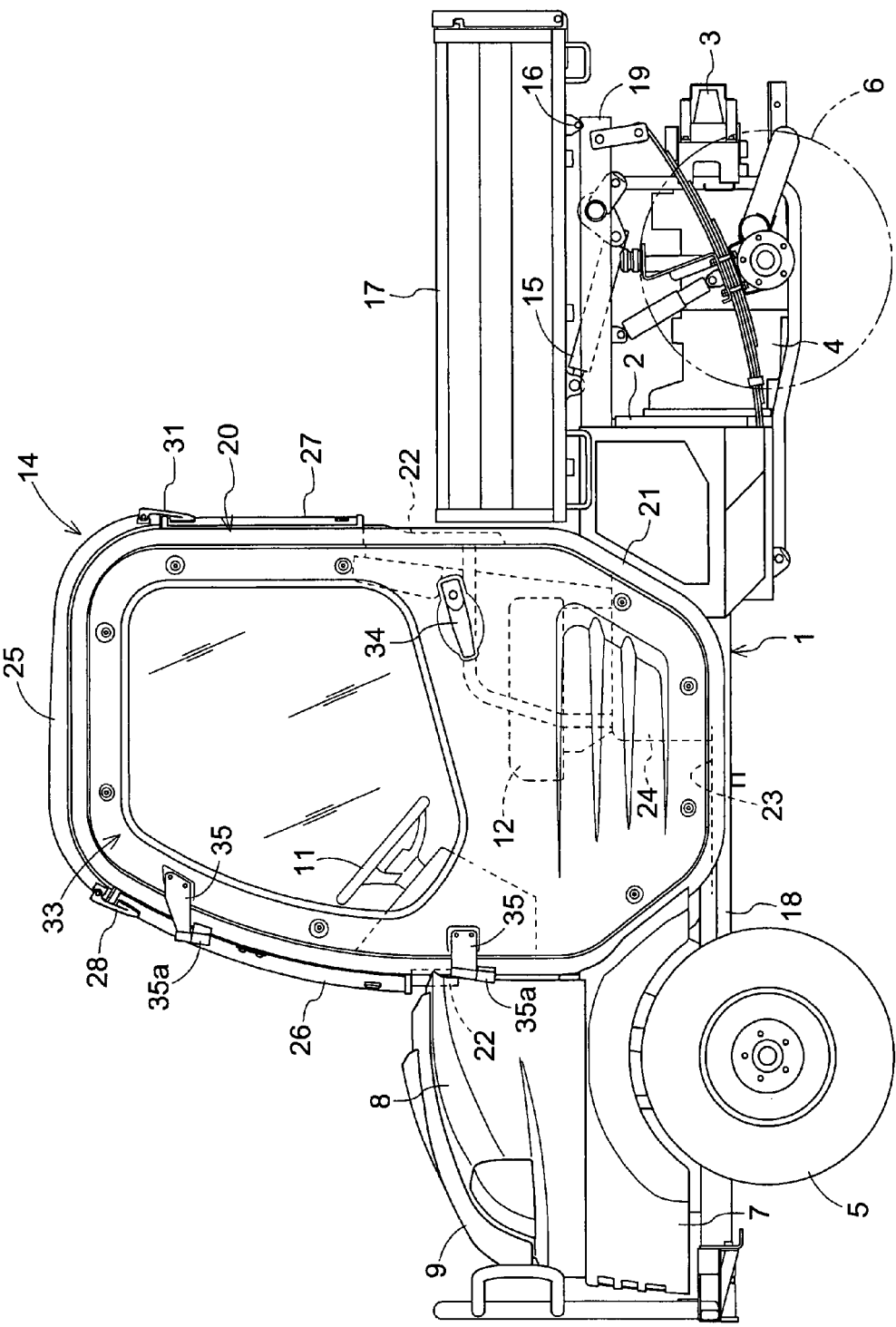
FIG. 1 is a left side view of the entirety of a utility vehicle.
Figure 2:
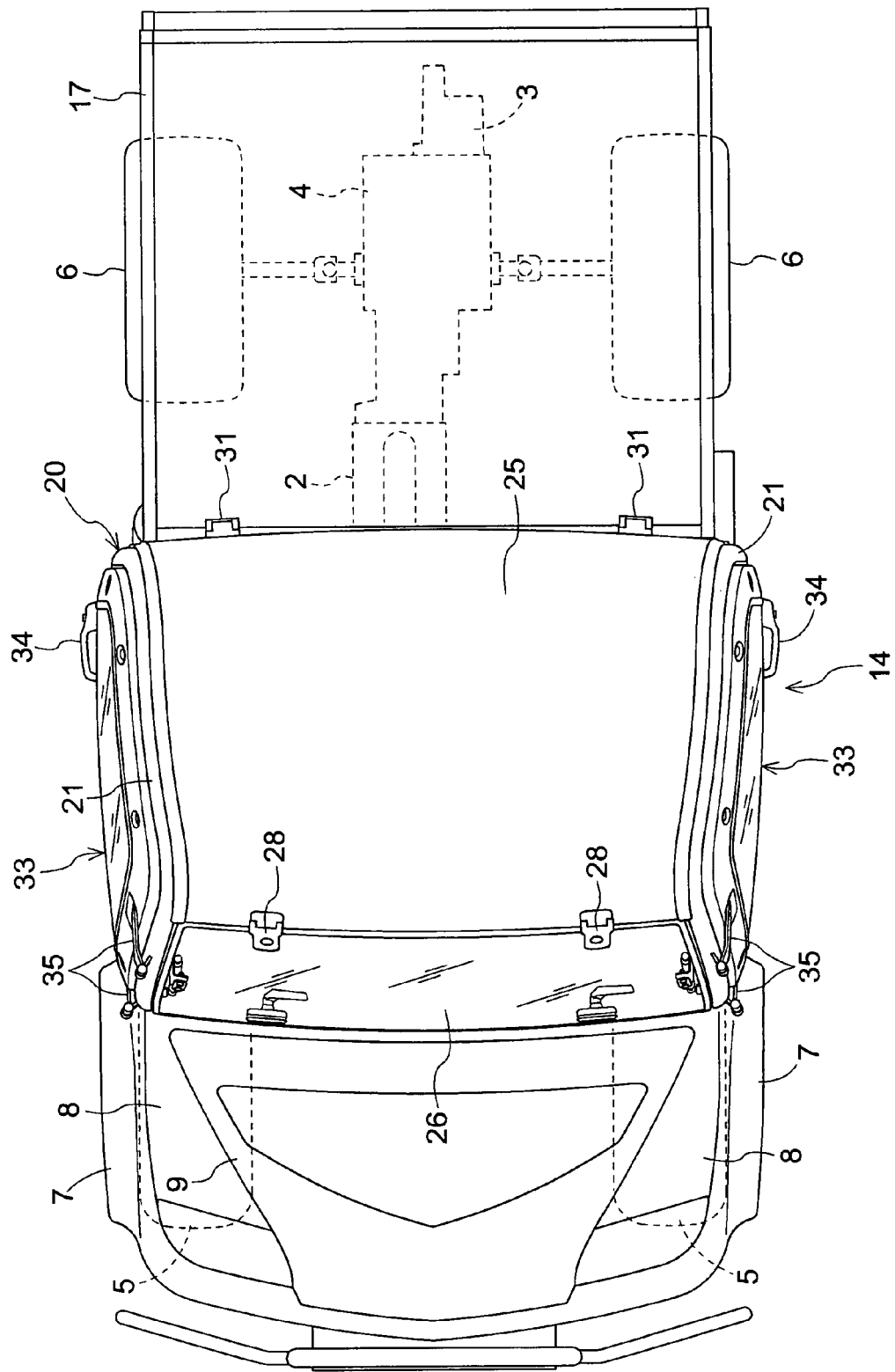
FIG. 2 is a plan view of the entirety of the utility vehicle.
Figure 3:
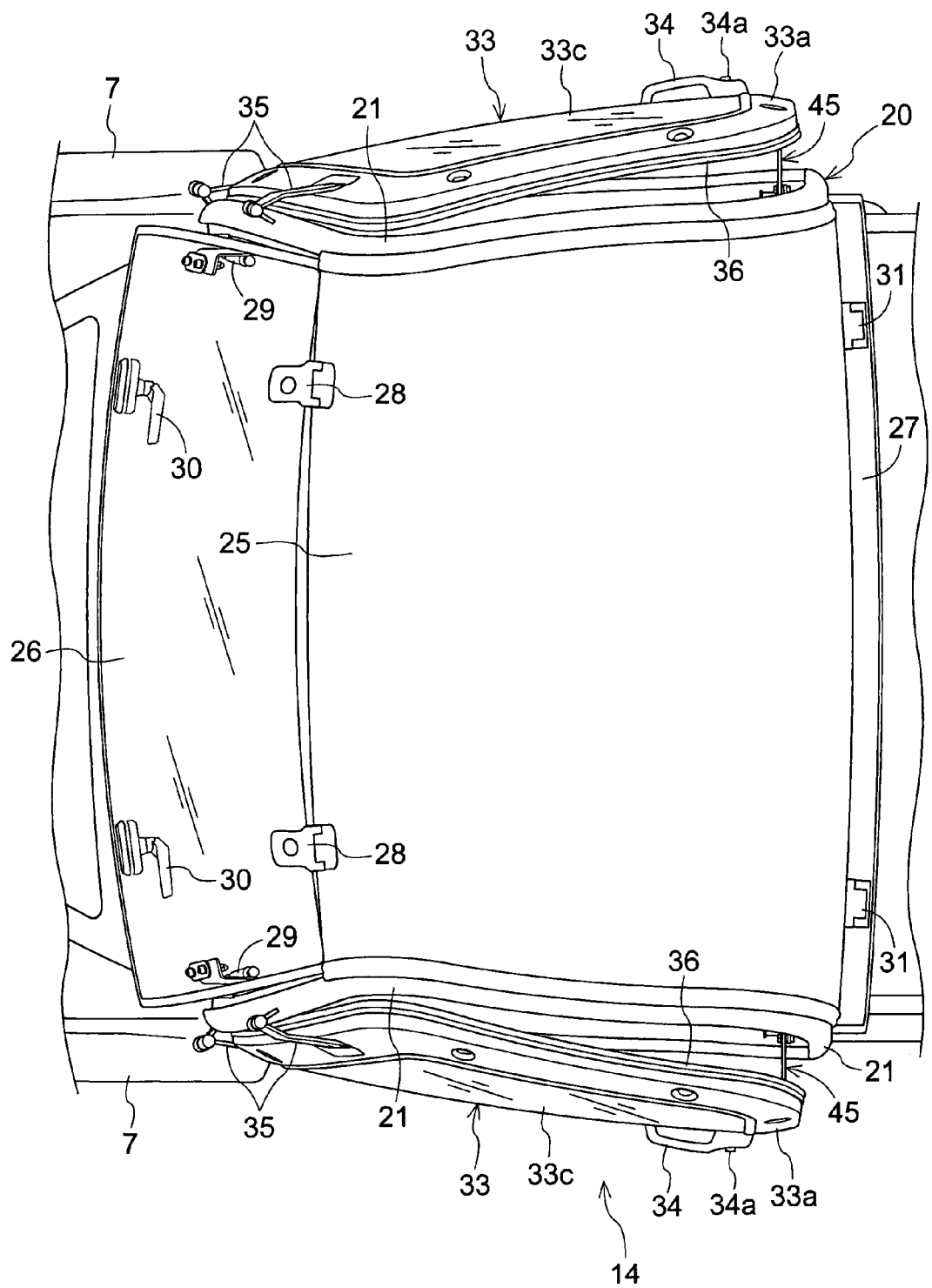
FIG. 3 is a plan view of the utility vehicle in a state in which a door is slightly open.
Figure 4:
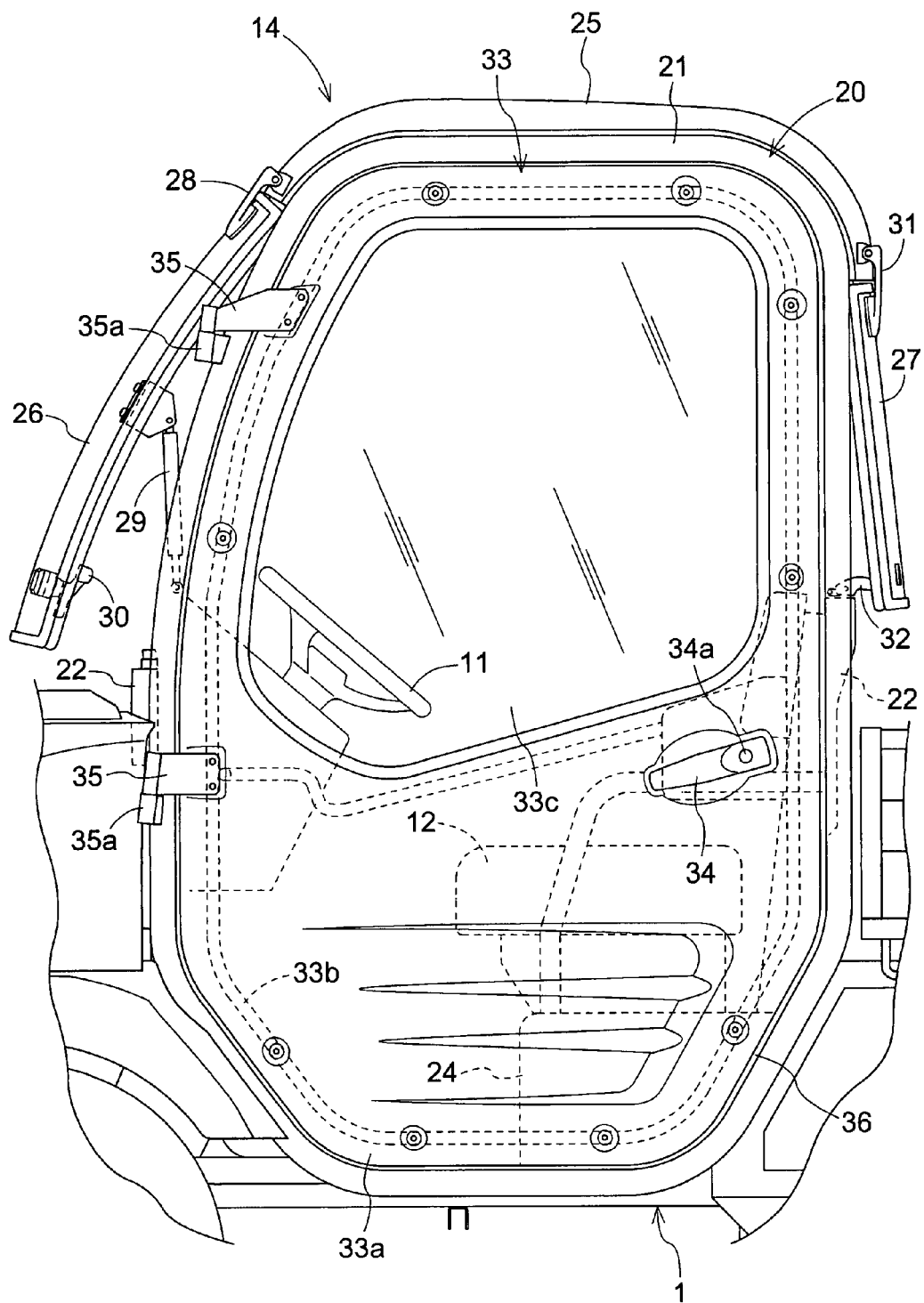
FIG. 4 is a left side view in a state in which a front glass and a rear glass are slightly open.

FIG. 1 shows a side view of the entirety of a utility vehicle that is an example of a work vehicle; and FIG. 2 shows a plan view of the entirety of the utility vehicle. In the utility vehicle, a motive force from an engine 2 supported by a vehicle body frame 1 in a vibration-proof state is transmitted to left and right pairs of front wheels 5 and rear wheels 6 via a gear-type transmission device 4 and a hydrostatic stepless transmission device 3 and the like, whereby a four-wheel drive is driven. A plan view of the utility vehicle in a state in which a door 33 is slightly open is shown in FIG. 3; and a left side view of a state in which a front glass 26 and a rear glass 27 are slightly open is shown in FIG. 4.

As shown in FIGS. 1 and 2, a lower cover 7 for a front wheel fender, an upper cover 8 having an opening in a lateral central part of an upper part, a pivoting opening and closing hood 9 for openably and closeably covering the opening, and the like are disposed on a front part of the multi-purpose vehicle.

A cabin 14 in which are provided a steering wheel 11 for steering the front wheels, an operator's seat 12, and the like is provided to a longitudinally central part of the utility vehicle. The cabin 14 forms an occupant space.

A hydraulic dump cylinder 15 is disposed above the gear-type transmission device 4 at the rear part of the utility vehicle. The dump cylinder 15 is extended and contracted, whereby a loading platform 17 is dumped in the vertical direction using a lateral support shaft 16 provided as a support point at a rear end part of the vehicle body frame 1.

The vehicle body frame 1 comprises a cabin frame 20 that forms the occupant space, a front part frame 18 and rear part frame 19 extending from the cabin frame 20 in the fore and aft direction, and the like. The various frames (e.g., 18, 19, 20) constituting the vehicle body frame 1 are securely welded together.

The cabin frame 20 comprises a left and right pair of door frames 21 that form a boarding and disembarking portal, a plurality of cross members 22 provided extending between the left and right door frames 21, a floor panel 23 for forming a floor for the occupant space, a support frame 24 for supporting the driver's seat 12, a roof panel (not shown) that is positioned at a ceiling portion of the occupant space and that is provided so as to extend between the left and right door frames 21, and the like. A front surface side and rear surface side of the cabin frame 20 are covered by the openable and closable front glass 26 and the openable and closable rear glass 27, respectively; and the top of the roof panel is covered by a resin outer roof 25.

The front glass 26 is pivotably supported by hinges 28 disposed to the left and right of an upper end part of the front glass so that a lower side of the front glass 26 opens toward the exterior of the vehicle, as shown in FIGS. 3 and 4. A gas damper 29 is mounted to left and right end parts of the lower part of the front glass 26 so as to extend between the front glass 26 and the door frame 21. When a lock handle 30 provided to the left and right side parts of the lower part of the front glass 26 is released, the front glass 26 is caused by a reactive force of the gas damper 29 to pivot in the fore and aft direction about the axis of the hinges 28, the lower side of the front glass 26 is opened toward the exterior of the vehicle, and outside air can be brought in toward the driver's seat 12 from the front.

The rear glass 27 is pivotably supported by hinges 31 disposed to the left and right of an upper end part of the rear glass so that a lower side of the rear glass 27 opens toward the exterior of the vehicle. A folding stay 32 is mounted to left and right side parts of a lower part of the rear glass 27 so as to extend between the rear glass 27 and the cross member 22. When a lock implement (not shown) provided to the stay 32 is released and the lower side of the rear glass 27 is pressed rearward from the inside, the rear glass 27 pivots in the fore and aft direction about an axis of the hinges 31, and the lower side of the rear glass 27 is opened toward the exterior of the vehicle. When the lower part of the rear glass 27 is opened in a state in which the lower part of the front glass 26 is open, external air brought in toward the driver's seat 12 from the front crosses over the driver's seat 12 and is discharged from the lower part of the rear glass 27.

Doors 33 are provided to both side parts of the cabin frame 20. When an opening and closing handle 34 is operated from inside or outside of the driver's seat 12, the outwardly opening left and right pair of doors 33 opens and closes in a single direction about an axis of hinges 35 disposed above and below front parts of the doors 33.

The door 33 comprises a door main body 33a formed by press-molding an ABS resin plate and covering a surface thereof with an acrylic sheet, a reinforcing frame 33b composed of a square pipe-shaped steel tube that has been bent and molded into a loop shape, and a side glass 33c installed in the door main body 33a. A sealing member 36 is fitted and installed in an outer peripheral part of the door main body 33a constituting the door 33 and then affixed to a door receiving part 21a of the door frames 21 in a state in which the door 33 is shut, whereby the door 33 can reliably be sealed.

The removable hinges 35 are anchored from the outside to the door main body 33a constituting the door 33. The removable hinges 35 are fitted from above into a boss part 35a that is anchored to the door frames 21 in a state of having been anchored to the door main body 33a, whereby the door 33 is mounted to the door frames 21 so as to be able to pivot open and closed.

Figure 7:
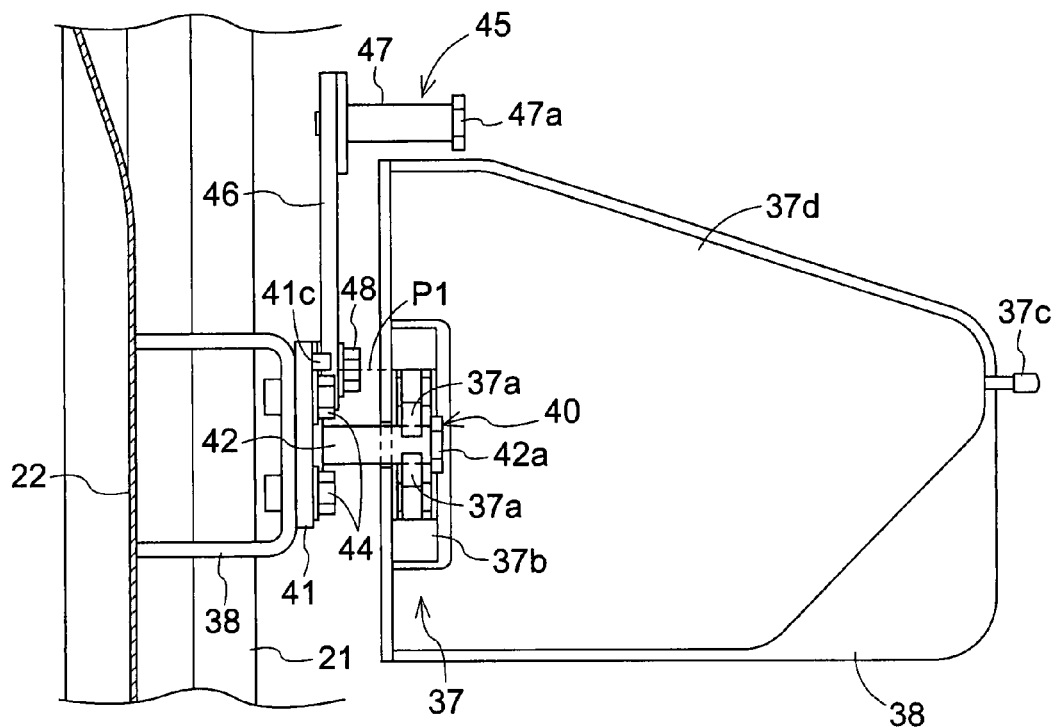
FIG. 7 is a side view of the auxiliary striker as seen from an inner side.

An opening and closing handle 34 provided with a lock release button 34a is anchored to an outer surface of the door 33, as shown in FIGS. 4 and 7. When the opening and closing handle 34 is gripped from the outside of the utility vehicle and the lock release button 34a is pressed, engagement with a lock pin 42 of the lock pawl 37a constituting a lock device 37 is released, and the door 33 can be opened.

Figure 5:
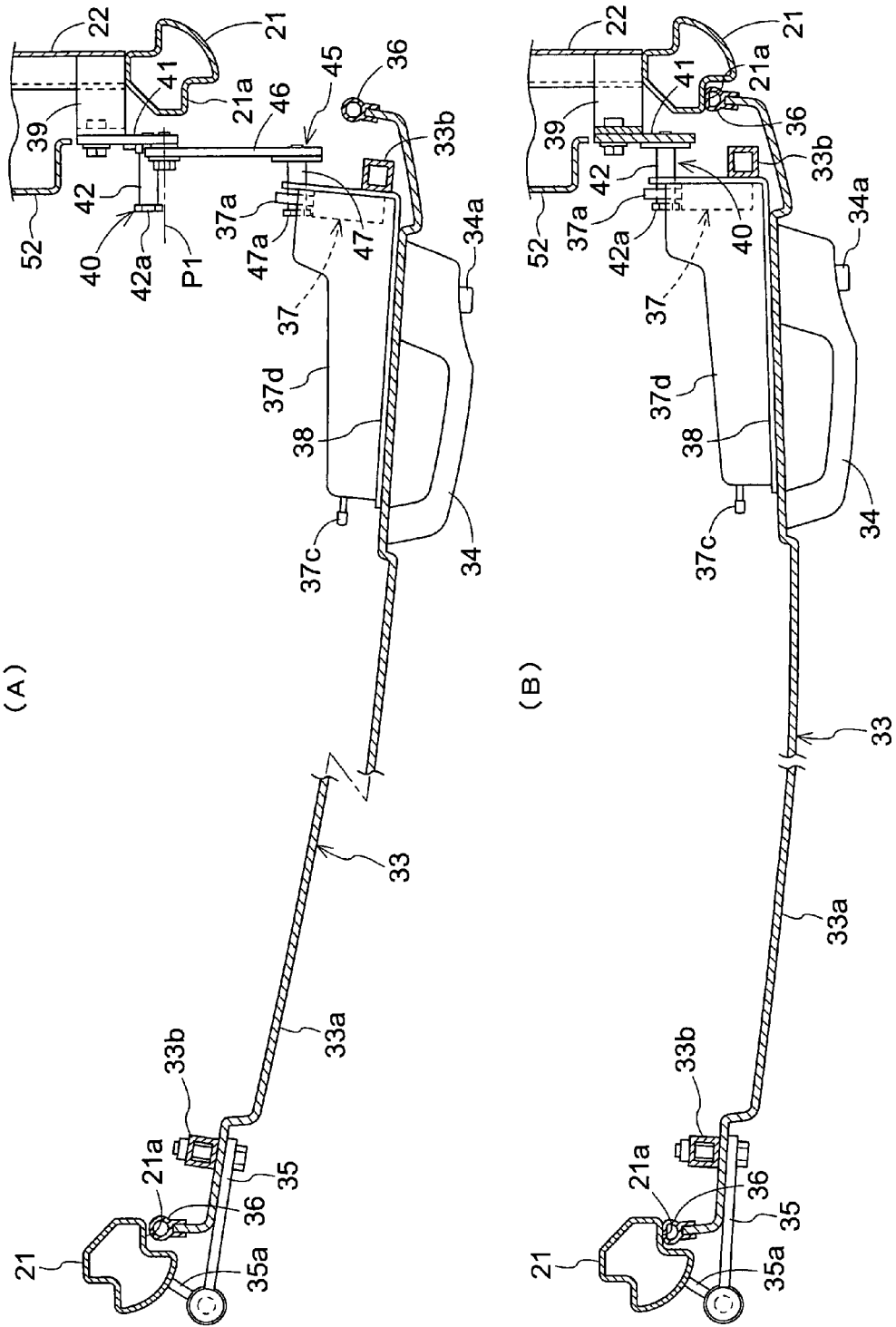
FIG. 5 is a lateral cross-sectional plan view showing a structure of an auxiliary striker.

A bracket 38 folded and formed on the inner side of the vehicle body is anchored to the reinforcing frame 33b (see FIG. 5). The lockable lock device 37 is anchored to the bracket 38. The door 33 is closed and the lock device 37 is engaged with the lock pin 42 or lock pin 47 anchored to the door frames 21, whereby the door 33 can be held in a closed state or a state of being slightly opened.

The lock device 37 comprises an upper and lower pair of lock pawls 37a, a case 37b, a lock release implement 37c, and the like. The upper and lower pair of lock pawls 37a is urged by a spring (not shown) housed in the case 37b toward a lock release state in which the lock pawls 37a are vertically open. When the door 33 is shut, the lock device 37 engages with the lock pin 42 or the lock pin 47, the lock pin 42 or lock pin 47 enacts a pressing force on the lock pawl 37a, the lock pawl 37a shuts against the urging force of the spring, and the lock pin 42 or lock pin 47 can be held in a state in which the lock pawl 37a is shut. The lock device 37 is covered by a resin protective cover 37d. Erroneous operation can be prevented without an interior of the lock device 37 being exposed, improving the outer appearance.

When the lock release implement 37c mounted to the lock device 37 is operated from the inside, or when the lock release button 34a of the opening and closing handle 34 is operated from the outside, the hold on the lock pawl 37a is released, the lock pawl 37 is opened by the urging force of the spring, the lock pin 42 or lock pin 47 is released from the lock device 37, and the door 33 can be opened or closed.

(Structure of Auxiliary Striker)

Figure 6:
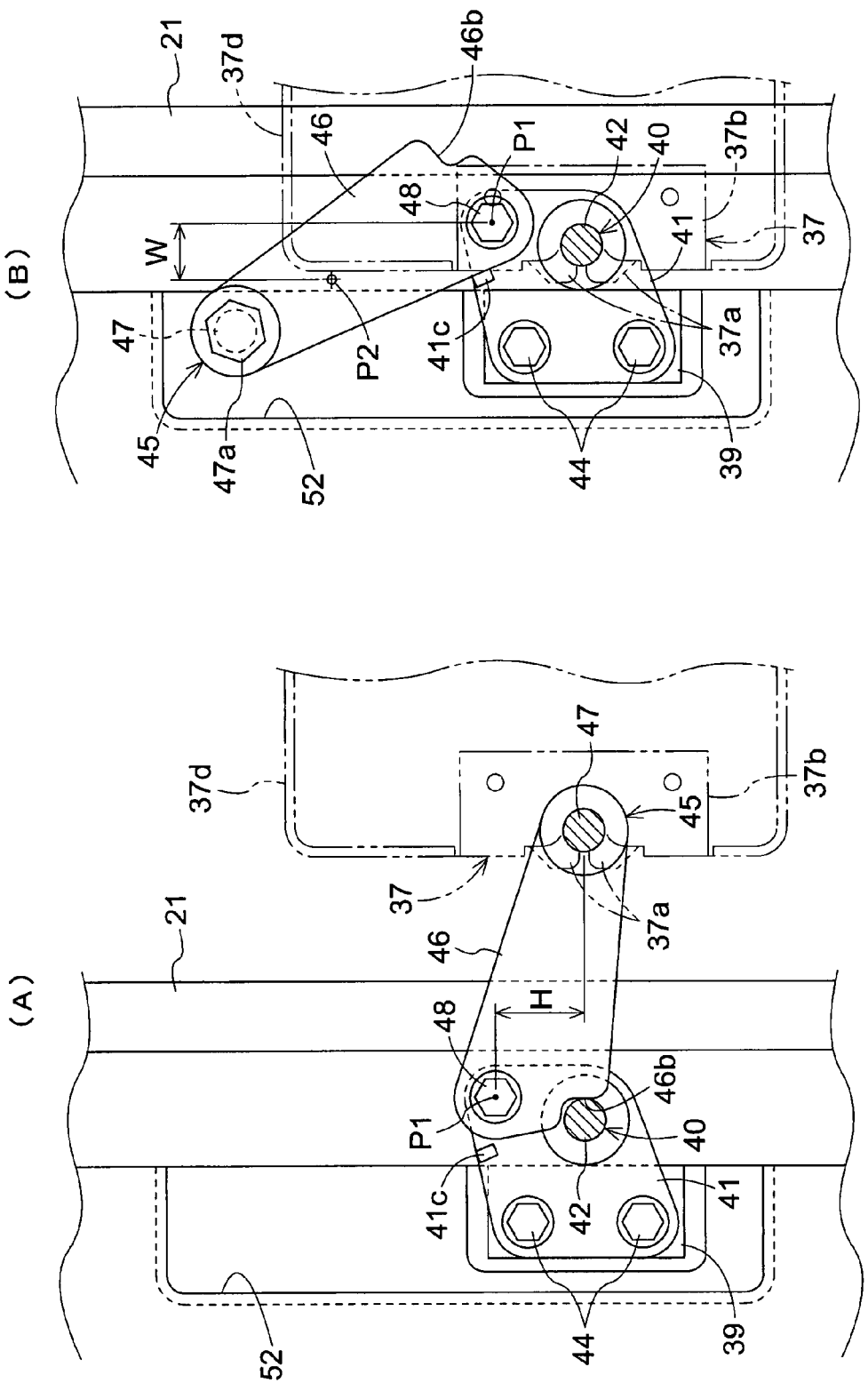
FIG. 6 is a front view showing the structure of the auxiliary striker.
Figure 8:
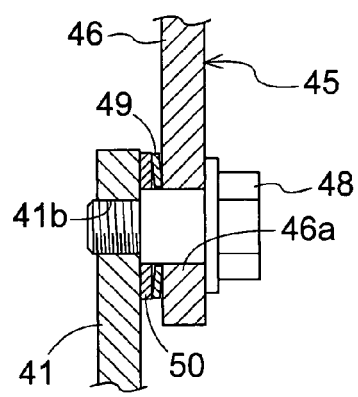
FIG. 8 is a longitudinal cross-sectional side view of a mounting part of the auxiliary striker.

A detailed structure of an auxiliary striker 45 according to the present invention is described in FIGS. 5 through 8. FIG. 5 shows lateral cross-sectional views of the vicinity of the auxiliary striker 45 in a held posture (FIG. 5A) and a retracted posture (FIG. 5B); and FIG. 6 shows front views of the vicinity of the auxiliary striker 45 in the held posture (FIG. 6A) and the retracted posture (FIG. 6B). The auxiliary striker rotates 150° or less from the retracted posture to reach the held posture. FIG. 7 shows a side view of the auxiliary striker 45 as seen from the inside; and FIG. 8 shows a longitudinal crosssectional view of a mounting part of the auxiliary striker 45. In FIGS. 5 through 8, a cabin door device of the left-side door 33 of the utility vehicle is described. However, the cabin door device of the right-side door 33 is basically a mirror image of the cabin door device of the left-side door 33.

A bracket 39 bent and molded into the shape of a square opened on a left side is anchored to the cross member 22 provided so as to extend between the left and right door frames 21, as shown in FIGS. 5 through 8. A striker 40 is anchored to the bracket 39 by two connecting bolts 44.

The striker 40 is composed of a tabular attaching part 41 and the lock pin 42, which is anchored to the attaching part 41. Attaching holes for use in anchoring to the bracket 39 and a threaded part 41b (described below) for attaching the auxiliary striker 45 are formed on the attaching part 41. A stopper 41c for controlling the inwardly pivoting range of the auxiliary striker 45 is anchored to an outer side of an upper attaching hole.

The lock pin 42 is composed of a columnar rod member that is long in the fore and aft direction. A hexagonal catching part 42a is formed on a distal end of the lock pin 42 so that engagement with the lock device 37 will not readily be released.

The attaching holes provided to the attaching part 41 of the striker 40 are machined to be larger than the outer form of the connecting bolts 44, and is configured so that the mounting angle and the vertical and lateral positions of the striker 40 can be adjusted. Machining the attaching holes provided to the attaching part 41 of the striker 40 thus enables the positions and mounting angles of the striker 40 and the auxiliary striker 45 to be precisely adjusted to match the position of the lock device 37, a seal to be reliably created in a state in which the door 33 is shut, and the position of the auxiliary striker 45 in the held posture, in which the door 33 is slightly open, to be adjusted.

The auxiliary striker 45 is composed of a flat arm part 46 and the lock pin 47 anchored to the arm part 46. The arm part 46 and the lock pin 47 reliably hold the door 33 in the held posture. The thickness of the arm part 46 and the outer diameter of the lock pin 47 are made larger so that the auxiliary striker 45 will not be deformed or damaged even if a large external force is enacted upon the auxiliary striker 45 by the utility vehicle travelling or the like.

A boss part 46a for rotatably mounting the auxiliary striker 45 to the striker 40 and a contact part 46b formed into a concave shape matching the shape of the lock pin 47 of the striker 40 are formed on the arm part 46 of the auxiliary striker 45. The contact part 46b brings the auxiliary striker 45 into contact with the lock pin 47 of the striker 40 in the held posture in which the door 33 is slightly open, and is provided in order to control a lower limit position of the pivoting range.

The lock pin 47 at a distal end part of the auxiliary striker 45 is composed of columnar rod member that is long in the fore and aft direction and that has the same shape as the lock pin 42 of the striker 40. A hexagonal catching part 47a is formed on a distal end of the lock pin 47 so that the lock device 37 will not readily be disengaged.

The auxiliary striker 45 is mounted to be able to pivot vertically about an axis of the mounting pin 48 via a diaphragm spring 49 and a collar 50 in a state of being fitted around the mounting pin 48 having a spring machined onto a distal end part (see FIG. 8). When the auxiliary striker 45 is pressed down against a reactive force of the diaphragm spring 49, the contacting part 46b of the arm part 46 comes into contact with the lock pin 42 of the striker 40, the auxiliary striker 45 is positioned in the held posture in which the lock device 37 has engaged, and the auxiliary striker 45 is lifted upward against the reactive force of the diaphragm spring 49. The position of the auxiliary striker is then held by the reactive force of the diaphragm spring 49 at a position where the auxiliary striker 45 is lifted upward, and the auxiliary striker 45 is held in the retracted posture that is retracted within the cabin 14. In the utility vehicle, the attaching part 41 of the striker 40 and the auxiliary striker 45 are held by friction via the diaphragm spring 49. However, the diaphragm 49 is not the only option for a configuration for holding the auxiliary striker 45 by friction, and another configuration may be used.

A configuration is used in which, in a state where the auxiliary striker 45 has been pivoted completely upward, the inward pivoting range of the auxiliary striker 45 is controlled by the stopper 41c, and the auxiliary striker 45 is prevented from mistakenly pivoting excessively and damaging a decorative cover 52 or the like.

The shape and other characteristics of the auxiliary striker 45 are set so that, in the held posture in which the auxiliary striker 45 is pushed downward, the axis of the lock pin 47 that engages with the lock device 37 is positioned below an axis P1 of the auxiliary striker 45 in the fore and aft direction, as shown in FIG. 6A (H in FIG. 6A). For this reason, in a state in which the auxiliary striker 45 is pushed down to the held posture, even if the door 33 comprising the lock device 37 is closed with great force from the outside and a large force acts upon the lock pin 47 in the lateral direction, the auxiliary striker 45 will be less severely raised by the force, and a state will reliably and easily be created in which the auxiliary striker 45 and the lock device 37 are engaged and the door 33 is held slightly open.

As shown in FIG. 6B, the shape and other characteristics of the auxiliary striker 45 are set so that a center of gravity P2 of the auxiliary striker 45 will be positioned further toward the inside of the vehicle body than the pivoting support point P1 of the auxiliary striker 45 in the retracted posture, in which a state is created where the auxiliary striker 45 is pivoted completely upward and brought into contact with the stopper 41c (W in FIG. 6B). For this reason, even if a centrifugal force in the lateral direction of the vehicle body is generated by the utility vehicle travelling, the auxiliary striker 45 will not readily fall outward against the reactive force of the diaphragm spring 49. For this reason, fewer component parts are involved and production costs are lower than when, e.g., a holding implement (not shown) for holding the auxiliary striker 45 in an upright state is provided separately. When the position of the auxiliary striker 45 is changed, an action for releasing the holding implement is not necessary, and the auxiliary striker 45 can therefore be made more user-friendly.

The auxiliary striker 45 is held at the retracted posture by the reactive force of the diaphragm spring 49 and the center of gravity of the auxiliary striker 45, thus fewer component parts are used and production costs are lower than when, e.g., a lock implement (not shown) or the like is provided separately and the auxiliary striker 45 is held at the retracted posture. When the position of the auxiliary striker 45 is changed, an action for releasing the lock implement or the like is not necessary, and the auxiliary striker 45 can therefore be made more user-friendly.

When the lower parts of the front glass 26 and the rear glass 27 are each opened, the auxiliary striker 45 changes position to the laterally oriented held posture and is linked to the lock device 37, the utility vehicle travels in a state in which the door 33 is slightly open, outside air can be brought in from the front toward the driver's seat 12, and the outside air brought in toward the driver's seat 12 can be discharged rearward from the gap in the slightly-opened door 33 and the gap at the bottom part of the rear glass, as shown in FIG. 3. Air therefore flows through the interior around the driver's seat 12, and the occupant space can be made comfortable.

Another embodiment relating to a cabin door device shall next be described.

Figure 9:
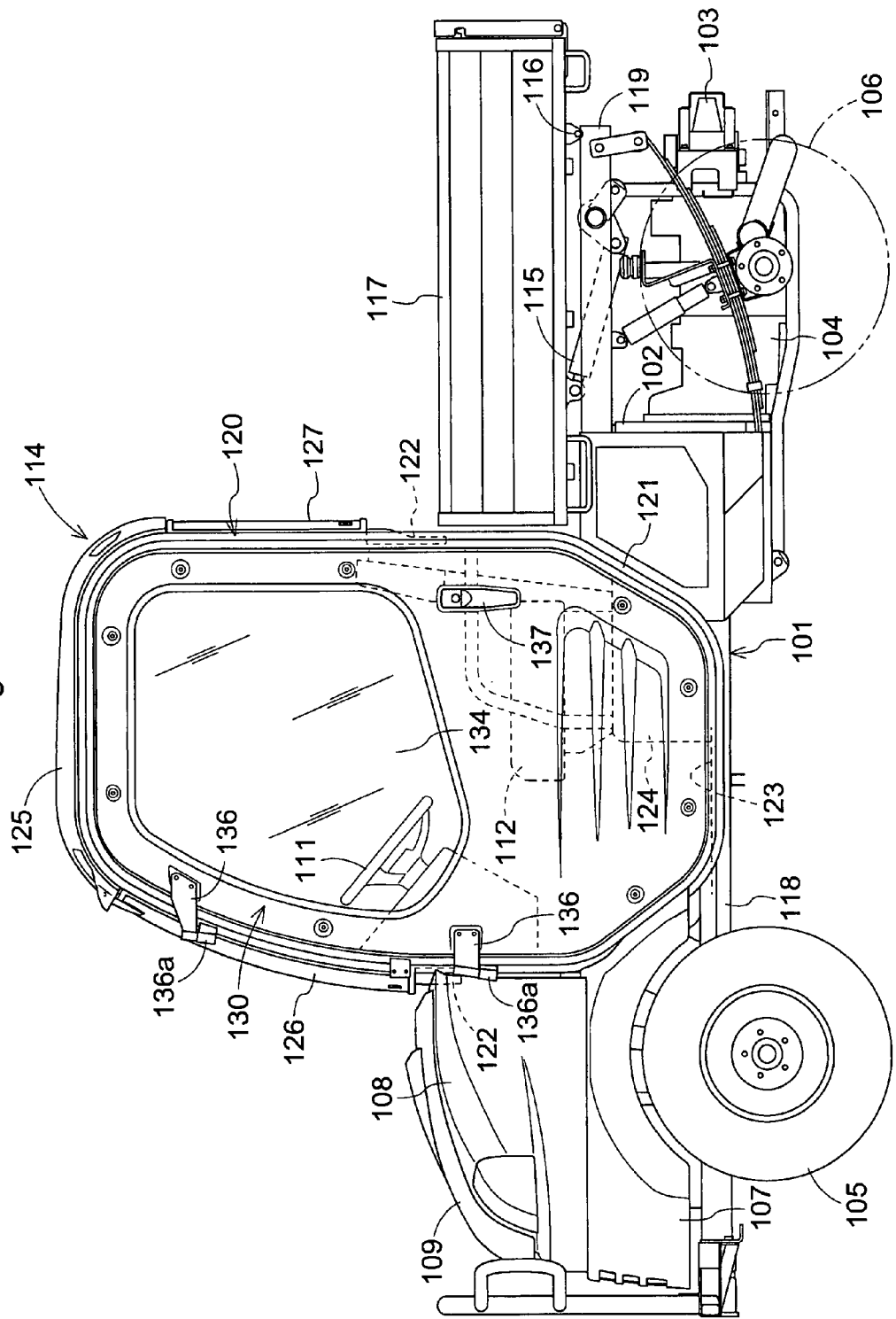
FIG. 9 is a left side view of the entirety of a utility vehicle according to another embodiment.
Figure 10:
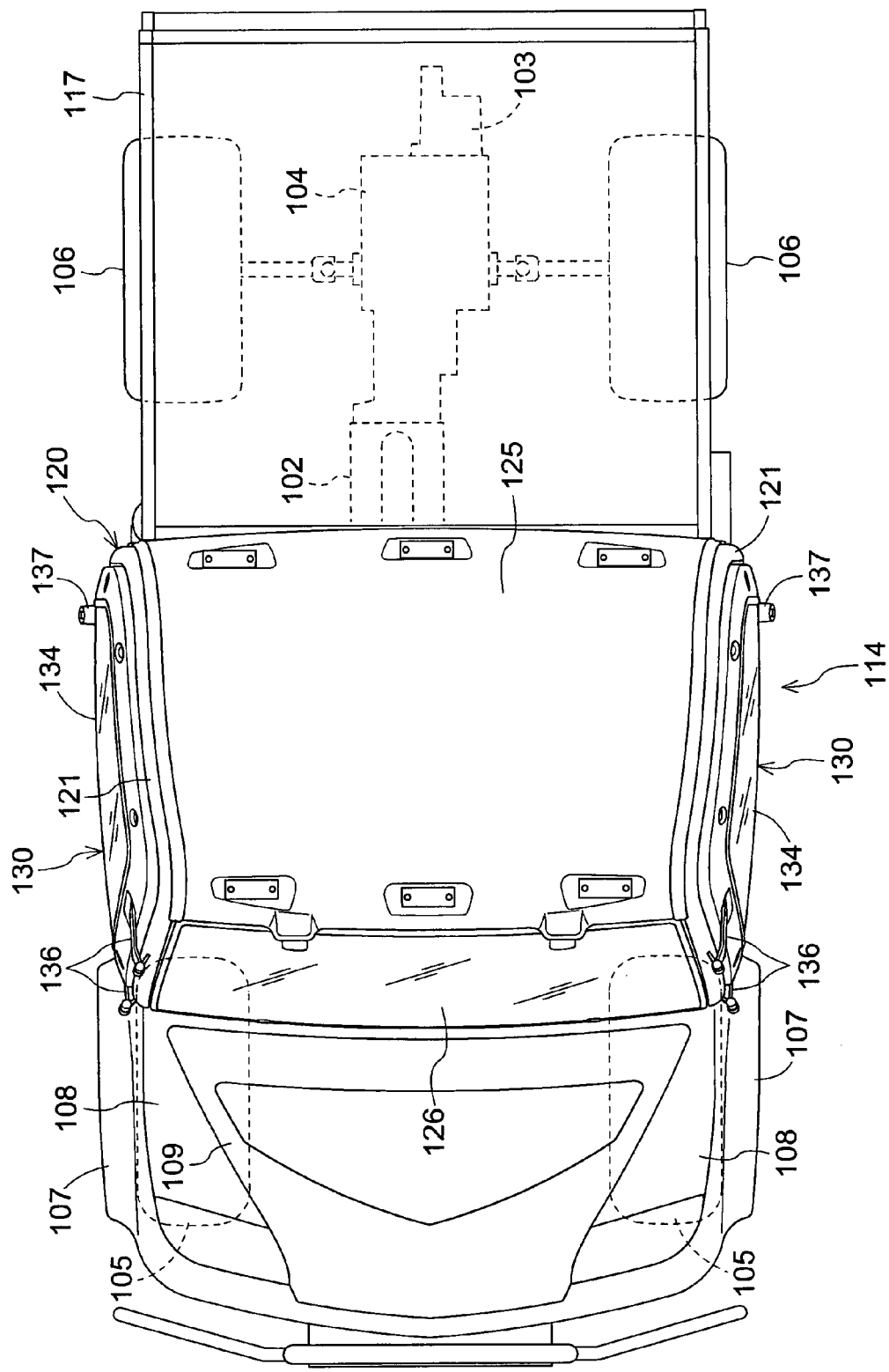
FIG. 10 is a plan view of the entirety of the utility vehicle according to the other embodiment.

A side view of an entire body of a utility vehicle that is an example of a work vehicle is shown in FIG. 9; and a plan view of an entirety of the utility vehicle is shown in FIG. 10. In the utility vehicle, a motive force from an engine 102 supported by a vehicle body frame 101 in a vibration-proof state is transmitted to left and right pairs of front wheels 105 and rear wheels 106 via a gear-type transmission device 104 and a hydrostatic stepless transmission device 103 and the like, whereby a four-wheel drive is driven.

A lower cover 107 for a front wheel fender, an upper cover 1088 having an opening in a lateral central part of an upper part, a pivoting opening and closing hood 109 for openably and closeably covering the opening, and the like are disposed on a front part of the multi-purpose vehicle.

A cabin 114 in which are provided a steering wheel 111 for steering the front wheels, an operator's seat 112, and the like is provided to a longitudinally central part of the utility vehicle. The cabin 114 forms an occupant space.

A hydraulic dump cylinder 115 is disposed above the gear-type transmission device 104 at the rear part of the utility vehicle. The dump cylinder 115 is extended and contracted, whereby a loading platform 117 is pivoted in the vertical direction using a lateral support shaft 116 provided as a support point at a rear end part of the vehicle body frame 101.

The vehicle body frame 101 comprises a cabin frame 120 that forms the occupant space, a front part frame 118 and rear part frame 119 extending from the cabin frame 120 in the fore and aft direction, and the like. The various frames (e.g., 118, 119, 120) constituting the vehicle body frame 101 are securely welded together.

The cabin frame 120 comprises a left and right pair of door frames 121 that form a boarding and disembarking portal, a plurality of cross members 122 provided extending between the left and right door frames 121, a floor panel 123 for forming a floor for the occupant space, a support frame 124 for supporting the driver's seat 112, a roof panel (not shown) that is positioned at a ceiling portion of the occupant space and that is provided so as to extend between the left and right door frames 121, and the like.

A front surface side and rear surface side of the cabin frame 120 are covered by the openable and closable front glass 126 and the openable and closable rear glass 127, respectively; and the top of the roof panel is covered by a resin outer roof 125.

A door 130 (described hereafter) is provided to each of the side surfaces of the cabin frame 120. When the opening and closing handle 137 is operated from inside or outside the driver's seat 112 and the door lock 138 is released, the outwardly opening left and right pair of doors 130 opens and closes in one direction about an axis of the hinges 136.

The cabin 114 is thus configured so that the driver's seat 112, outer roof 125, front glass 126, rear glass 127, doors 130 (described hereafter) are installed in the cabin frame 120.

(Detailed Structure of the Door)

Figure 11:
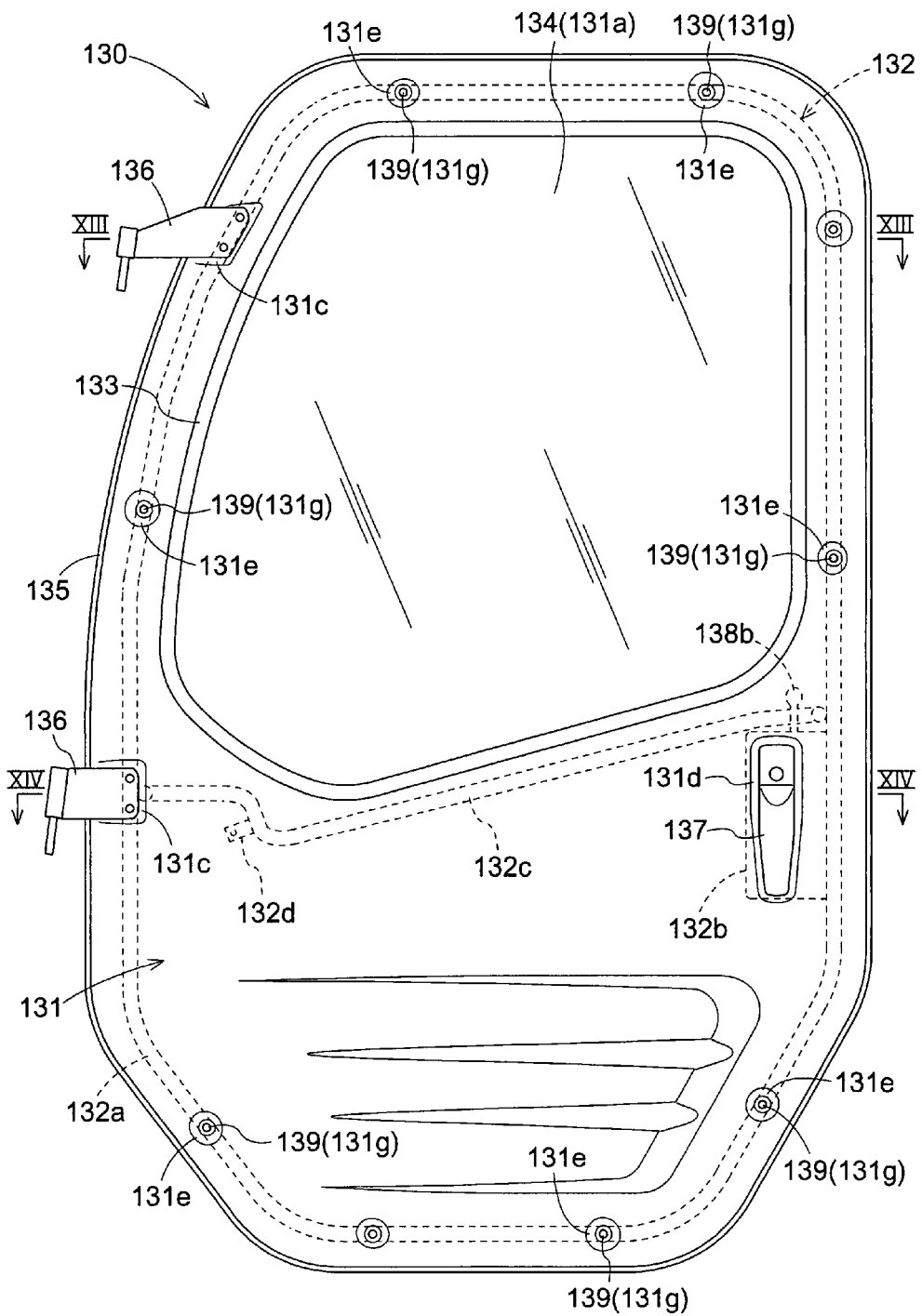
FIG. 11 is a side view of a left door according to the other embodiment as seen from outside.
Figure 12:
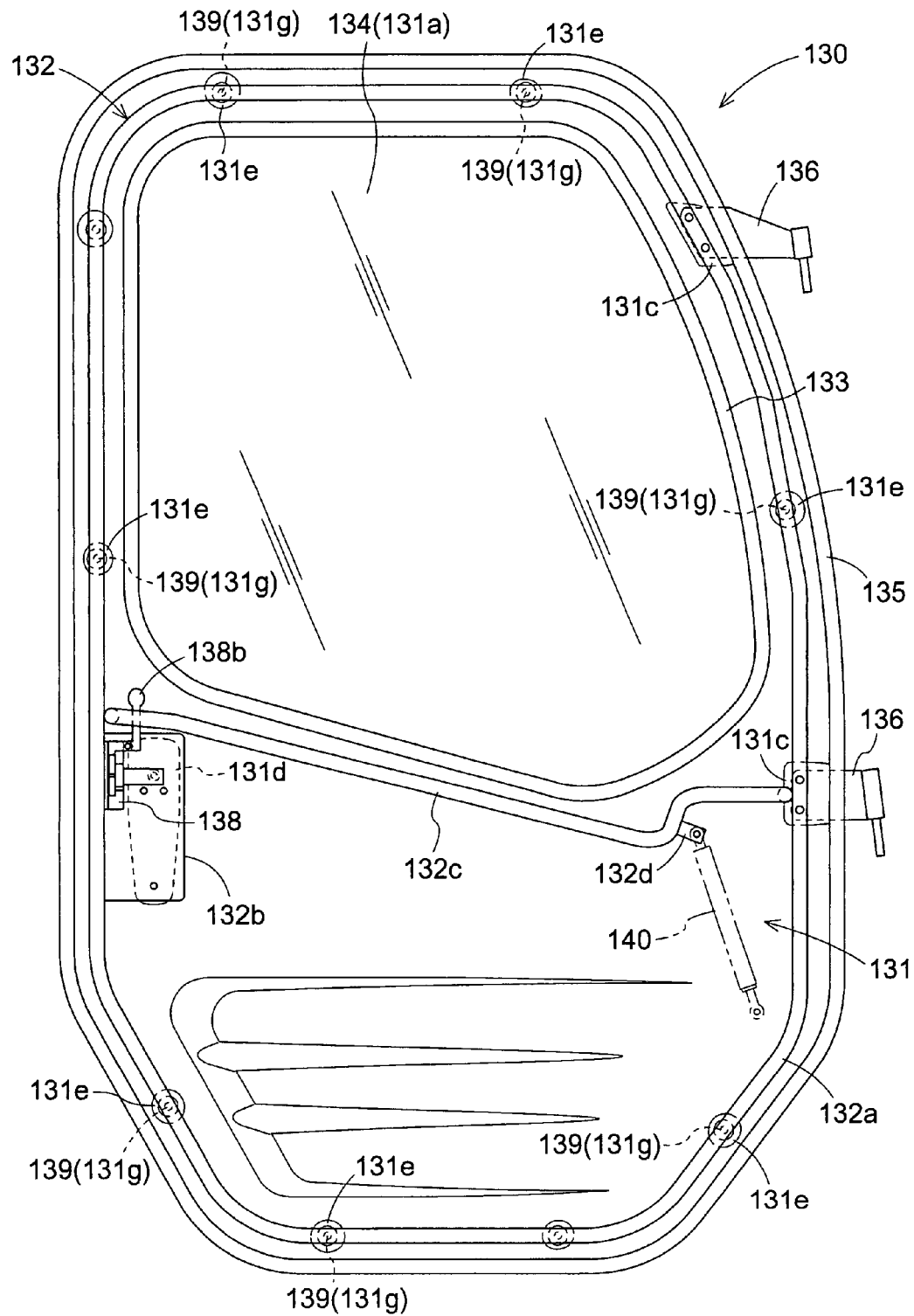
FIG. 12 is a side view of the left door according to the other embodiment as seen from inside.
Figure 13:
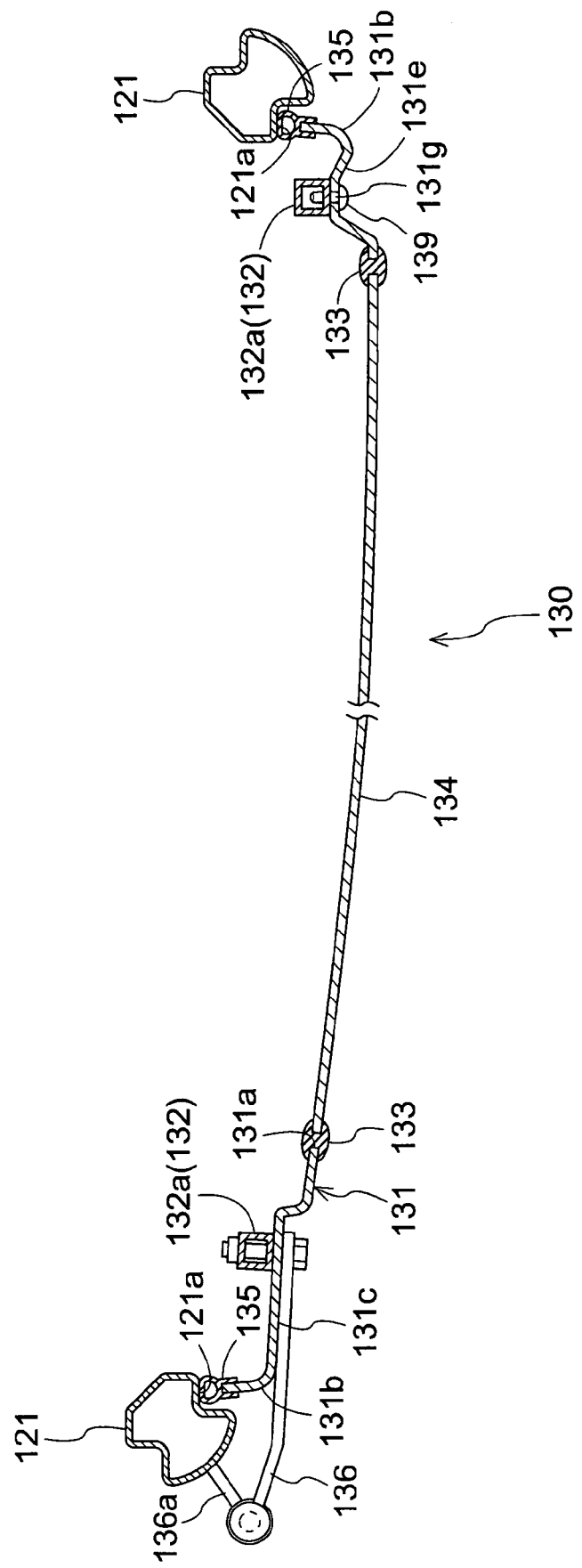
FIG. 13 is a cross-sectional view showing a structure of the door along a XIII-XIII line of FIG. 11.
Figure 14:
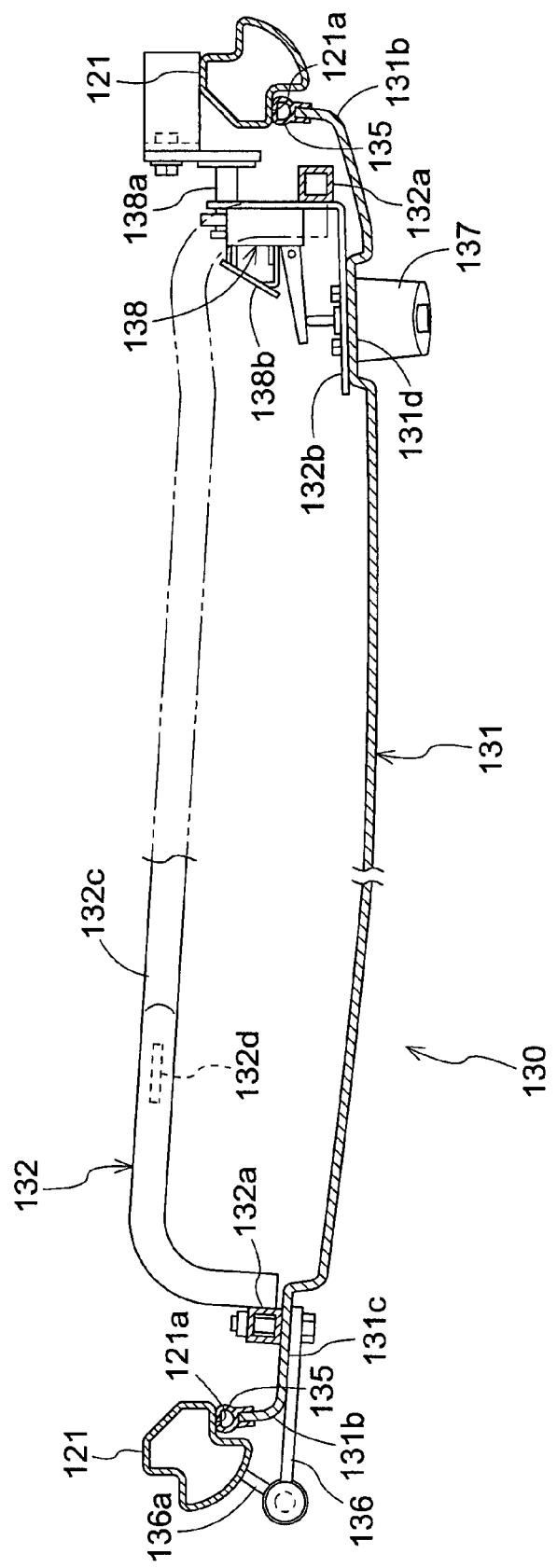
FIG. 14 is a cross-sectional view showing the structure of the door along a XIV-XIV line of FIG. 11.

A structure of a door for the cabin 114 according to the present invention shall be described with reference to FIGS. 11 through 14. FIG. 11 shows a side view of the door 130 as seen from the outside; and FIG. 12 shows a side view of the door 130 as seen from inside. FIGS. 13 and 14 show cross-sectional views along the XIII-XIII line and XIV-XIV line of FIG. 11, respectively, in a state in which the door 130 is mounted to the door frame 121. In FIGS. 11 through 14, the left-side door 130 of the utility vehicle is described. However, the right-side door 130 is the same as the left-side door 130.

The door 130 comprises a resin door main body 131, a reinforcing frame 132 anchored to the door main body 131, a side glass 134 installed in the door main body 131, an opening and closing handle 137, a door lock 138, and the like.

The door main body 131 constituting the door 130 is formed by press-molding an ABS resin plate and covering a surface thereof with an acrylic sheet. An opening 131a is formed at a center part of the door main body 131. The side glass 134 is mounted to the opening 131a via a gasket 133.

A bending part 131b formed into a bent shape is formed on the inside of the vehicle body across the entire outer peripheral part of the door main body 131. A sealing member 135 is fitted and anchored from the inside along the entire periphery of a distal end of the bending part 131b (see FIG. 13). The bending part 131b is thus formed on the outer peripheral part of the door main body 131, whereby the strength of the door main body 131 at the outer peripheral part of the door 130 is ensured.

The door main body 131 is formed from a resin, whereby a distal end part of the bending part 131b in which the seal member 135 is fitted can readily be shaved in accordance with the door frame 121, and a hole-drilling process for the attaching holes for mounting the hinges 136 and the like can be readily performed. For this reason, when, for example, the door main body 131 is attached to the door frame 121, follow-up processes can readily be performed, and the ability to perform assembly operations can be improved.

A hinge mounting part 131c for anchoring the hinges 136 for connecting the door 130 to the door frame 121, a handle mounting part 131d for anchoring the opening and closing handle 137 to the door main body 131, and frame anchoring parts 131e for connecting the reinforcing frame 132 to the door main body 131 are integrally formed on the door main body 131.

The hinge mounting part 131c is formed into a concave shape from the outer surface of the door main body 131 toward the inside of the vehicle body. The removable hinge 136 is anchored from the outside to the concave part, and is fitted from above into a boss part 136a (see FIG. 9) anchored to the door frame 121 in a state in which the removable hinge 136 has been anchored to the door main body 131, whereby the door 130 can be openably and closeably mounted to the door frame 121.

The handle mounting part 131d is formed into a concave shape that extends from the outer surface of the door main body 131 toward the inside of the vehicle body, and the opening and closing handle 137 is anchored from outside of the concave part. The frame anchoring parts 131e are formed into a concave shape extending from the outer surface of the door main body 131 toward the inside of the vehicle body 131. An attaching holes 131g for anchoring the door frame 121 is machined into the concave part.

The forming of the hinge mounting part 131c, handle mounting part 131d, and frame anchoring parts 131e into concave shapes extending from the outer surface of the door main body 131 toward the inside of the vehicle body thus enables the hinge 136, the opening and closing handle 137, and frame mounting screws 139 to be mounted without protruding from the outer surface of the door main body 131. For this reason, the opening and closing handle 137 and the like can be mounted without interfering with a driver of the utility vehicle, and the outer appearance of the utility vehicle can be improved.

The reinforcing frame 132 comprises a pipe part 132a composed of a square-pipe shaped steel tube that has been bent and molded into a loop shape, a bracket 132b for mounting the door lock 138, a handrail 132c (described hereafter), and the like. Nuts for use in mounting to the door main body 131 are formed at a plurality of locations on the reinforcing frame 132. The reinforcing frame 132 is anchored from the outer surface of the door main body 131 by the frame mounting screws 139 via the attaching holes 131g. The anchoring is achieved in such a state that contact is made from the inside with the inwardly concave parts of the handle mounting part 131d and the frame anchoring parts 131e formed on the inner surface of the door main body 131.

The lockable door lock 138 is anchored to the bracket 132b. The door 130 is shut, and the door lock 138 engages with a lock pin 138a anchored to the door frame 121, whereby the door 130 can be held in a shut state (see FIG. 14). A lock release implement 138b is mounted on the door lock 138. When the lock release implement 138b is operated from inside or when the opening and closing handle 137 is operated from the outside, the door lock 138 is released, and the door 130 can be opened and closed.

The handrail 132c is anchored across the reinforcing frame 132 that is disposed near the lower hinge 136 and the reinforcing frame 132 that is disposed close above the opening and closing handle 137, and a gas damper mounting bracket 132d is anchored to a lower side of a front part of the handrail 132c, as shown in FIG. 12.

The handrail 132c is formed into a shape created by bending both end parts of a curved cylindrical pipe toward the reinforcing frame 132. The curving of the cylindrical pipe enables the handrail 132c to be disposed along a line on the lower side of the side glass 134. For this reason, the handrail 132c can be kept from interfering with the field of view from inside the driver's seat 112 and outward through the side glass 134, and the outer appearance of the driver's seat 112 can be improved.

A gas damper 140 for assisting in the opening and closing of the door 130 is mounted so as to extend between the door frame 121 and the gas damper mounting bracket 132d that is anchored to the handrail 132c. As a result, the installation of a stay (not shown) or the like for mounting the gas damper 140 is no longer necessary, and production costs are thereby reduced; the reactive force of the gas damper 130 can more readily act upon the door 130; and the gas damper 140 can be disposed in a position where the gas damper is less likely to cause interference even when the door is opened and closed.

A door receiving part 121a having a concave shape matching the shape of the door 130 is formed along an entire periphery of the left and right pair of loop-shaped door frames 121 that form the boarding and disembarking portals, as shown in FIGS. 13 and 14. The door 130 is mounted to the door receiving part 121a via the hinge 136 so that the sealing member 135 anchored to the distal end of the bending part 131b will be tightly attached in a state in which the door 130 is shut, and the positions of the door lock 138 and lock pin 138a are adjusted.

When the door 130 is shut and the door lock 138 engages with the lock pin 138a anchored to the door frame 121, the force of the door 130 shutting acts upon the sealing member 135, and the sealing member 135 is compressed, whereby a reliable seal is created between the door 130 and the door receiving part 121a. The force of the door 130 shutting acts upon the door main body 131, the door main body 131 undergoes slight elastic deformation, and a returning force of the elastic deformation acts in a direction in which the sealing member 135 is pressed against the door receiving part 121a of the door frame 121, allowing the seal between the door 130 and the door receiving part 121a to be improved.

In particular, the bending part 131b is provided to the outer peripheral part of the door main body 131, and the bending part 131b and reinforcing frame 132 are formed so that the bending part 131b will be positioned to the outside of the reinforcing frame 132 shown in FIG. 12. Therefore, the shutting force of the door 130 that is transferred to the door main body 131 by the handrail 132c being pulled and pushed does not readily act upon the portion surrounded by the reinforcing frame 132 shown in FIG. 12, but readily acts upon the bending part 131b positioned to the outside of the portion surrounded by the reinforcing frame 132 shown in FIG. 12. For this reason, the force of the door 130 shutting can effectively be made to act on the sealing member 135 via the bending part 131b.

The reinforcing frame 132 is mounted extending along the bending part 131b at the outer peripheral part of the door main body 131 at a uniform distance. Therefore, the force of the door 130 shutting acts uniformly across the entire periphery of the door 130.

The bending part 131b is provided to the outer peripheral part of the door main body 131. Accordingly, when the bending part 131b is slightly deformed and the door main body 131 is elastically deformed by the force of the door 130 shutting, the returning force of the elastic deformation causes the sealing member 135 to operate perpendicularly to the seal surface of the door frame 121. The door 130 can be better sealed.

OTHER EMBODIMENT

In the above-described embodiments, examples were described in which the auxiliary striker 45 is held at the held and retracted postures by the reactive force of the diaphragm spring 49. However, a configuration may also be used in which the auxiliary striker 45 is held in place by its own weight in the held posture, a holding implement (not shown) for holding the position in the retracted posture is provided separately, and the position of the auxiliary striker 45 can be changed to the held posture and the retracted posture. Specifically, a configuration may be used in which, e.g., a lock pin (not shown) and a lock clasp (not shown) are provided so as to extend between the auxiliary striker 45 and the attaching part 41 of the striker 40, and the auxiliary striker 45 can be held at the retracted posture. A configuration may also be used in which a holding implement (not shown) for holding the position of the auxiliary striker 45 in the held posture is provided separately.

A utility vehicle is described as an example of a work vehicle in the above-described embodiments. However, any other work vehicle may be used as long as the work vehicle comprises a cabin. The present invention may be employed in, e.g., a tractor, combine, or other agricultural vehicle; or a backhoe, wheel loader, or other construction vehicle.

In the above-described embodiments, examples were described in which the door can be pivoted open and closed about the axis of the hinge disposed on a front part of the door. However, a configuration may also be used in which the hinge is provided to a rear part of the door, and the door can be pivoted open and closed about an axis of the hinge on the rear part of the door. In addition, the sealing member may be anchored to the door frame instead of to the bending part of the door main body.

In the above-described embodiments, examples were described in which the door main body constituting the door is formed by press-molding an ABS resin plate. However, the door main body may be formed from a different material as long as the material is an elastic resin. For example, a plastic plate or a synthetic resin plate may be used.

In the above-described embodiments, examples were described in which the reinforcing frame was formed from a square pipe-shaped steel tube and the handrail was formed from a cylindrical pipe. However, the cross-sectional shapes and outer shapes of the reinforcing frame and the handrail may be other shapes.

What is claimed is:

1. A cabin door device mounted on a vehicle and having a cabin frame and a door mounted to a side part of the cabin frame so as to be moveable between a fully closed position and a fully open position, the cabin door device comprising:
   a main striker supported by the cabin frame, wherein the door has a lock device, and the door is held in the fully closed position by the lock device engaging the main striker; and
   an auxiliary striker that is supported by the cabin frame and whose position can be changed between a held posture, in which the door is held at an intermediate position between the fully closed position and the fully open position by coupling with the lock device, and a retracted position, which is displaced toward an interior of the cabin and in which the lock device of the door is allowed to engage with the main striker; wherein the auxiliary striker is pivotable about a fore/aft axis extending in a longitudinal direction of the vehicle;

wherein the main striker includes a first lock pin that can engage with the lock device, and the auxiliary striker includes a second lock pin that can engage with the lock device; and wherein the auxiliary striker further includes a contact part, the contact part contacting the first lock pin when the second lock pin engages with the lock device, to maintain the auxiliary striker in the held posture.

2. The door device of claim 1, wherein the auxiliary striker in the held posture is generally oriented in a lateral direction of the vehicle, and the auxiliary striker in the retracted position is generally oriented in a vertical direction of the vehicle.

3. The door device of claim 1, wherein the auxiliary striker is disposed such that the second lock pin of the auxiliary striker in the held position is at a lower position than the fore/aft axis about which the auxiliary striker pivots.

4. The door device of claim 1, wherein the auxiliary striker rotates 150° or less from the retracted posture to come to the held posture.

5. The door device of claim 1, wherein the auxiliary striker is held in the retracted position by a member and by its own center of gravity.

6. A door striker device for a cabin mounted on a vehicle, the cabin having a cabin frame and a door mounted to a side part of the cabin frame so as to be pivotal about a vertical axis extending in a vertical direction of the vehicle, the door being displaceable to a fully closed position, a fully open position and an intermediate position between the fully closed position and the fully open position by its pivotal movement about the vertical axis, the door striker device comprising:

a main striker fixed to the cabin frame;

an auxiliary striker attached to the cabin frame so as to be pivotal about a fore/aft axis extending in a longitudinal direction of the vehicle; and a lock device provided to the door so as to selectively engage one of the main striker and the auxiliary striker;

wherein the auxiliary striker is pivoted outward of the cabin about the fore/aft axis to take a horizontally elongated posture and engaged with the lock device when the door is displaced and held at the intermediate position;

wherein the auxiliary striker is pivoted inward of the cabin about the fore/aft axis to take a vertically elongated posture and the main striker is engaged with the lock device when the door is displaced and held at the fully closed position;

wherein the main striker includes a first lock pin and the auxiliary striker includes a second lock pin;

wherein the lock device includes a lock pawl device, the lock pawl device engaging the first lock pin when the lock device engages the main striker, and the lock pawl device engaging the second lock pin when the lock device engages the auxiliary striker; and wherein the auxiliary striker further includes a contact part, the contact part contacting the first lock pin of the main striker when the auxiliary striker is engaged with the lock device to control the pivoting range of the auxiliary striker.

7. The door striker device of claim 6, wherein the lock pawl device includes an upper pawl and a lower pawl, the upper pawl engaging either the first or second lock pin from above, the lower pawl engaging either the first or second lock pin from below.

8. A door striker device for a cabin mounted on a vehicle, the cabin having a cabin frame and a door mounted to a side part of the cabin frame so as to be pivotal about a vertical axis extending in a vertical direction of the vehicle, the door being displaceable to a fully closed position, a fully open position and an intermediate position between the fully closed position and the fully open position by its pivotal movement about the vertical axis, the door striker device comprising:

a main striker fixed to the cabin frame;

an auxiliary striker attached to the cabin frame so as to be pivotal about a fore/aft axis extending in a longitudinal direction of the vehicle; and a lock device provided to the door so as to selectively engage one of the main striker and the auxiliary striker;

wherein the auxiliary striker includes a lock pin which is engaged with the lock device when the door is in the intermediate position;

wherein the door is held in the fully closed position when the main striker is engaged with the lock device; and in the fully closed position, the auxiliary striker is pivoted about the fore/aft axis toward an interior of the cabin, the lock pin is positioned at a higher level than the fore/aft axis and a center of gravity of the auxiliary striker is positioned further toward the interior of the cabin than the fore/aft axis; and wherein the door is held in the intermediate position when auxiliary striker is pivoted about the fore/aft axis toward an outside of the cabin and engaged with the lock device; and in the intermediate position, the lock pin is positioned at a higher level than the fore/aft axis.

9. The door striker device of claim 8, wherein the main striker includes a further lock pin which is engaged with the lock device when the door is in the fully closed position, the further lock pin being positioned at a lower level than the fore/aft axis when the door is in both of the fully closed position and the intermediate position.

* * * * *